(No Model.)

J. MURPHY.
HAND RAKE.

No. 551,507.                     Patented Dec. 17, 1895.

Witnesses:
Walter C. Pusey.
Ira S. Heller.

Inventor.
Jeffrey Murphy,
per Joshua Pusey,
Attorney.

UNITED STATES PATENT OFFICE.

JEFFREY MURPHY, OF PHILADELPHIA, PENNSYLVANIA.

HAND-RAKE.

SPECIFICATION forming part of Letters Patent No. 551,507, dated December 17, 1895.

Application filed May 10, 1895. Serial No. 548,805. (No model.)

*To all whom it may concern:*

Be it known that I, JEFFREY MURPHY, a citizen of the United States, residing at the city and county of Philadelphia and State of Pennsylvania, have invented certain new and useful Improvements in Hand-Rakes, of which the following is a full, clear, and exact description, reference being had to the accompanying drawings, of which—

Figure 1:
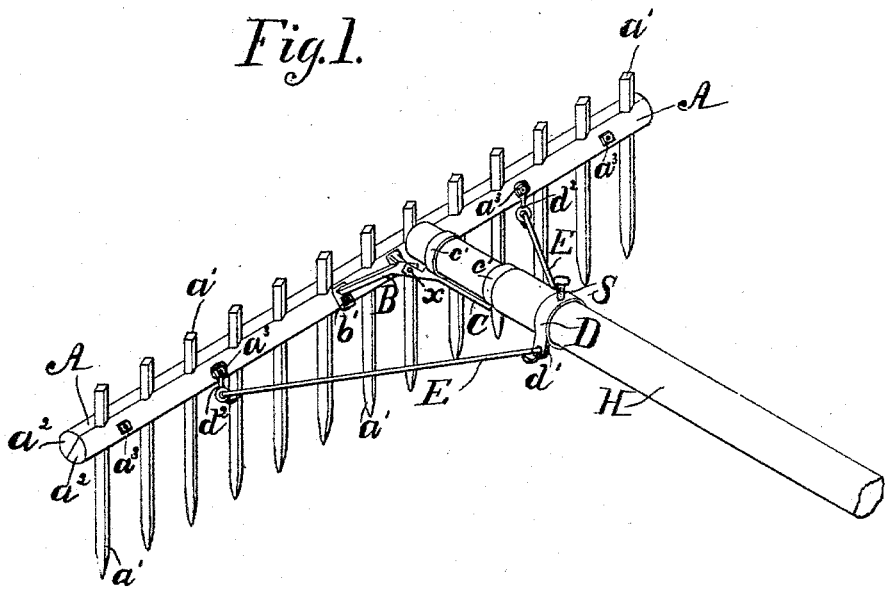
Figure 2:
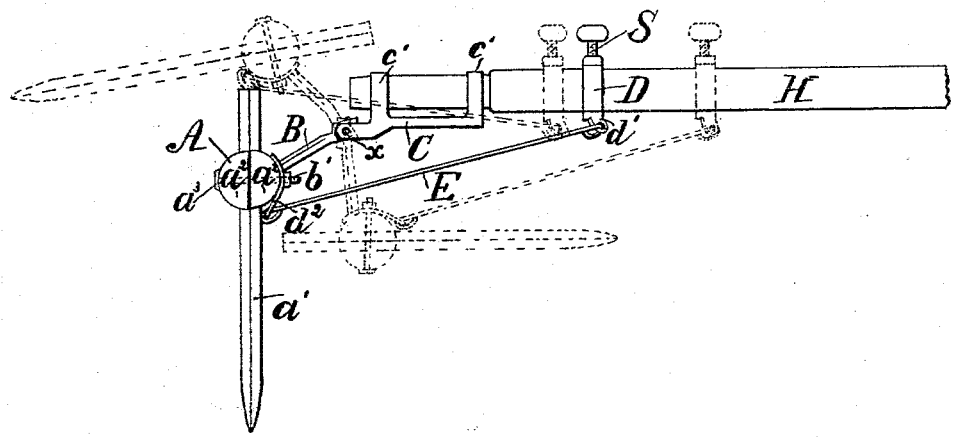

Figure 1 is a perspective; Fig. 2, a side elevation.

The invention relates to hand-rakes, more especially to lawn-rakes. Its object is to provide such a rake that may be readily and conveniently attached to and, if desired, as readily detached from its handle, and also whose series of teeth may quickly and easily be set to any required angle with relation to the handle and the surface upon which they are to be used, and maintained at such adjustment, all by simple means.

The particular nature of the improvement will clearly appear from the following description, reference being had to the annexed drawings.

In the drawings, A is the bar or head which carries the usual series of teeth $a'$.

B is an arm or bracket, preferably of Y shape, as shown, one end of which is secured by a bolt or bolts $b'$ to the head A, and its other end is pivoted at $x$ to the forward end of a piece or casting C, which is provided with apertured lugs or rings $c'$, adapted to receive the end portion of the handle H.

D is a ring or annulus adapted to slide freely on the handle.

E E are two divergent rods, having each one end pivoted to a lug $d'$ on each side of said ring, and the other end pivoted to the rake-head A, preferably to an eye-lug $d^2$, secured to the latter as shown.

S is a thumb-screw working in ring D.

In attaching the rake, the ring D and the apertured casting C are slid on the handle to the positions shown in the drawings. The series of teeth are then set to the desired angle, and the screw S is turned so as to cause its end to impinge against the handle, and the rake is ready for use.

The full lines in Fig. 2 show one adjustment of the rake, and the dotted lines about the extreme outward and inward adjustments, the latter being a suitable position for packing or shipping the rake. It will be observed that the rake-head is capable of adjustment through an arc of substantially one hundred and eighty degrees.

It will be obvious that when the several parts are constructed as shown, the rake and its adjuncts may be supplied independently, and readily applied to any ordinary suitable handle.

As the teeth of rakes, especially when made of wood, are liable to become broken, it is desirable to provide a means for readily replacing a broken tooth with a sound one. To this end, I make the bar or head A in two longitudinal parts or halves $a^2$, between which I clamp the teeth by means of through-bolts $a^3$, each of said halves being cut away at suitable intervals in order to form apertures to receive the teeth.

Having thus described my invention, I claim as new and desire to secure by Letters Patent—

1. In a hand rake, the combination of a handle, a bracket secured to said handle and projecting forwardly thereof the rake head connected to said bracket and capable of swinging therewith through an arc of substantially one hundred and eighty degrees, an annulus arranged to slide on said handle, and diverging rods pivoted to the said annulus and to the rake head, together with means for securing said annulus in the desired position upon the handle, substantially as specified.

2. The combination of the teeth-carrying head, the piece, or casting, having the handle receiving apertures, the bracket secured to said head and pivoted to said casting, the annulus adapted to receive a suitable handle and to slide longitudinally thereon, the set screw or the like, together with the pivoted rods connecting the teeth-carrying head and the annulus, substantially as and for the purpose specified.

In testimony whereof I have hereunto affixed my signature in the presence of two subscribing witnesses.

JEFFREY MURPHY.

Witnesses:
JOSEPH W. SHANNON,
WALTER C. PUSEY.